US010810543B2

(12) United States Patent
Hsieh et al.

(10) Patent No.: US 10,810,543 B2
(45) Date of Patent: Oct. 20, 2020

(54) POPULATING CATALOG DATA WITH ITEM PROPERTIES BASED ON SEGMENTATION AND CLASSIFICATION MODELS

(71) Applicant: Maplebear, Inc., San Francisco, CA (US)

(72) Inventors: Jonathan Hsieh, San Francisco, CA (US); Oliver Gothe, El Cerrito, CA (US); Jeremy Stanley, Oakland, CA (US)

(73) Assignee: Maplebear, Inc., San Francisco, CA (US)

( * ) Notice: Subject to any disclaimer, the term of this patent is extended or adjusted under 35 U.S.C. 154(b) by 165 days.

(21) Appl. No.: 16/048,800

(22) Filed: Jul. 30, 2018

(65) Prior Publication Data
US 2020/0034782 A1 Jan. 30, 2020

(51) Int. Cl.
*G06Q 10/08* (2012.01)
*G06N 3/08* (2006.01)

(52) U.S. Cl.
CPC ............. *G06Q 10/087* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 2015/0310601 A1* | 10/2015 | Rodriguez | ............. | G06K 9/209 348/150 |
| 2016/0171336 A1* | 6/2016 | Schwartz | ................. | G06K 9/18 382/173 |
| 2017/0286901 A1* | 10/2017 | Skaff | .................... | G06K 9/3241 |
| 2019/0035028 A1* | 1/2019 | Jones | ..................... | G06N 20/00 |

OTHER PUBLICATIONS

PCT International Search Report and Written Opinion, PCT Application No. PCT/US19/39075, dated Sep. 24, 2019, ten pages.

* cited by examiner

*Primary Examiner* — Paul Danneman
(74) *Attorney, Agent, or Firm* — Fenwick & West LLP (57) ABSTRACT

A method for populating an inventory catalog includes receiving an image showing an item in the inventory catalog and comprising a plurality of pixels. A machine learned segmentation neural network is retrieved to determine location of pixels in an image that are associated with an image label and the property. The method determines a subset of pixels associated with the item label in the received image and identifies locations of the subset of pixels of the received image, and extracts the subset of pixels from the received image. The method retrieves a machine learned classifier to determine whether an image shows the item label. The method determines, using the machine learned classifier, that the extracted subset of pixels shows the item label. The method updates the inventory catalog for the item to indicate that the item has the property associated with the item label.

18 Claims, 7 Drawing Sheets

POPULATING CATALOG DATA WITH ITEM PROPERTIES BASED ON SEGMENTATION AND CLASSIFICATION MODELS

BACKGROUND

This disclosure relates generally to a process for adding item information to an inventory catalog of a delivery system, and specifically to using images of the catalog items to determine the item information.

In current delivery systems, shoppers, or "pickers," fulfill orders at a physical warehouse, such as a retailer, on behalf of customers as part of an online shopping concierge service. The delivery system provides customers with a user interface that displays an inventory catalog listing items that a customer can add to an order. In current delivery systems, the inventory catalog may be generated from information provided to the delivery system by the physical warehouses. However, the provided item information may not include various properties of an item, such as whether an item is organic or vegan, or any number of food certifications, gradings, etc. This information may be important to a consumer's selection of items to add to a delivery order, e.g., due to a customer's dietary restrictions, health concerns, religious practices, etc. If this information is not included in the inventory catalog, the consumer cannot make a fully informed decision on which items to add to the order. However, adding item properties to the inventory catalog can be difficult if they are not provided by the warehouse or available through other data sources. Food properties, such as organic certifications, are often indicated through common visual symbols, or item labels, which appear on item packaging. In conventional delivery systems, adding item properties to an inventory catalog requires manual input by a person visually observing the item who translates between the item label and an item property.

SUMMARY

As described herein, a delivery system can generate and use machine-learned models to update item property information in an item catalog or inventory database. The machine-learned models are trained using images of items in a warehouse and images of item labels. A first-level machine-learned model is trained using images of items in a warehouse to determine if input images of items include any of a variety of item labels, such as organic labels, vegan labels, etc. Second-level machine-learned models are trained using images of item labels to classify input images as indicating a particular item property. For example, one classifying machine-learned model can determine whether or not an item is organic, another classifying machine-learned model can determine whether or not an item vegan, etc. Pixels identified by the first machine-learned model as being associated with an item label may be input into the second machine-learned model to confirm the item property indicated by the identified label. The item entry in an item catalog may then be updated with the confirmed item property.

A method for populating an inventory catalog includes receiving an image showing an item having an entry in an inventory catalog. The image includes a plurality of pixels. The method retrieves a machine learned segmentation neural network, which is trained based on a set of images and associated property data, to determine location of pixels in an image that are associated with an image label associated with a property. The method determines, using the machine learned segmentation neural network, a subset of pixels associated with the item label in the received image and identifies locations of the subset of pixels of the received image. The method extracts the subset of pixels from the received image. The method retrieves a machine learned classifier, which is trained based on a set of images of the item label, to determine whether an image shows the item label. The method determines, using the machine learned classifier, that the extracted subset of pixels shows the item label. The method updates the entry for the item in the inventory catalog to indicate that the item has the property associated with the item label.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
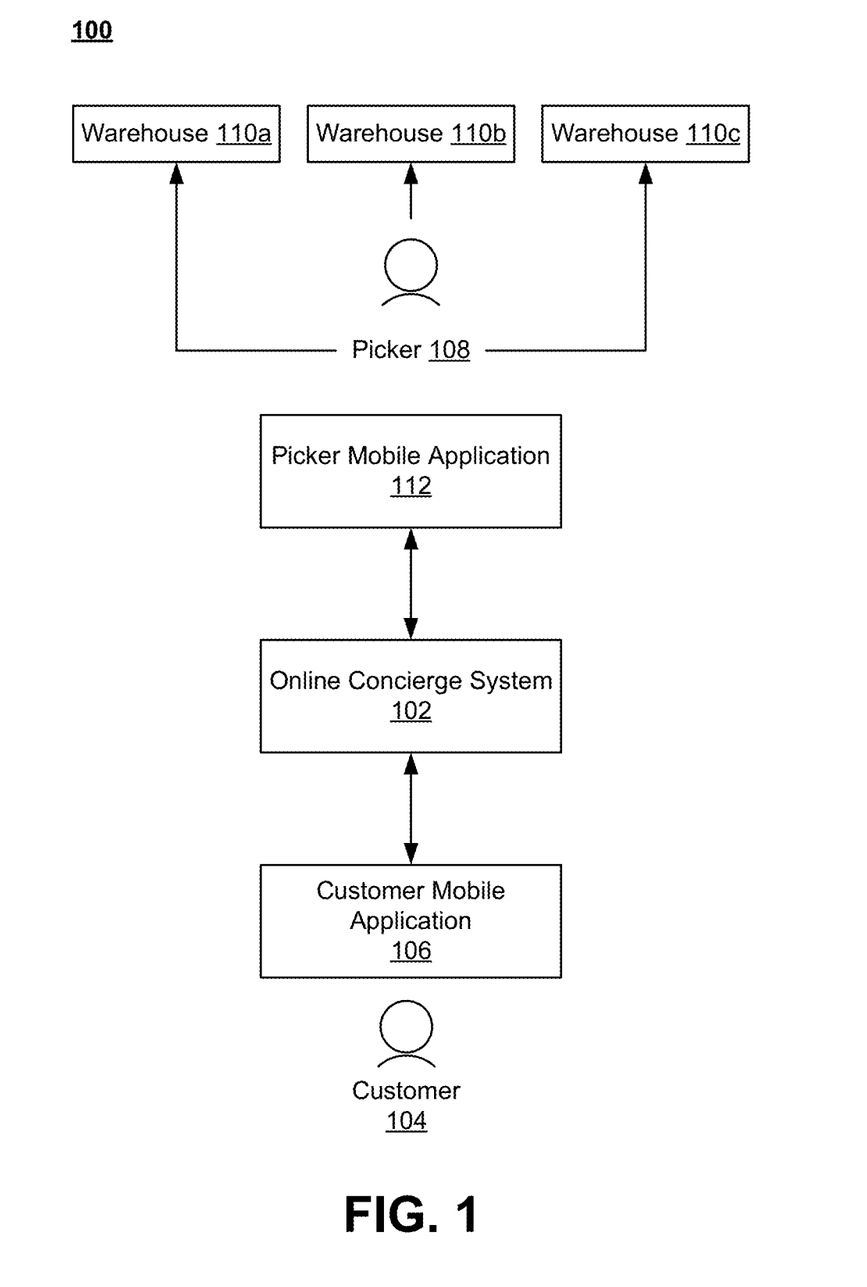
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer 104 may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The picker 108 travels between a warehouse and a delivery location (e.g., the customer's home or office). A picker 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each picker 108 fulfills an order received from the online concierge system 102 at one or more warehouses 110, delivers the order to the customer 104, or performs both fulfillment and delivery. In one embodiment, pickers 108 make use of a picker mobile application (PMA) 112 which is configured to interact with the online concierge system 102.

Figure 2:
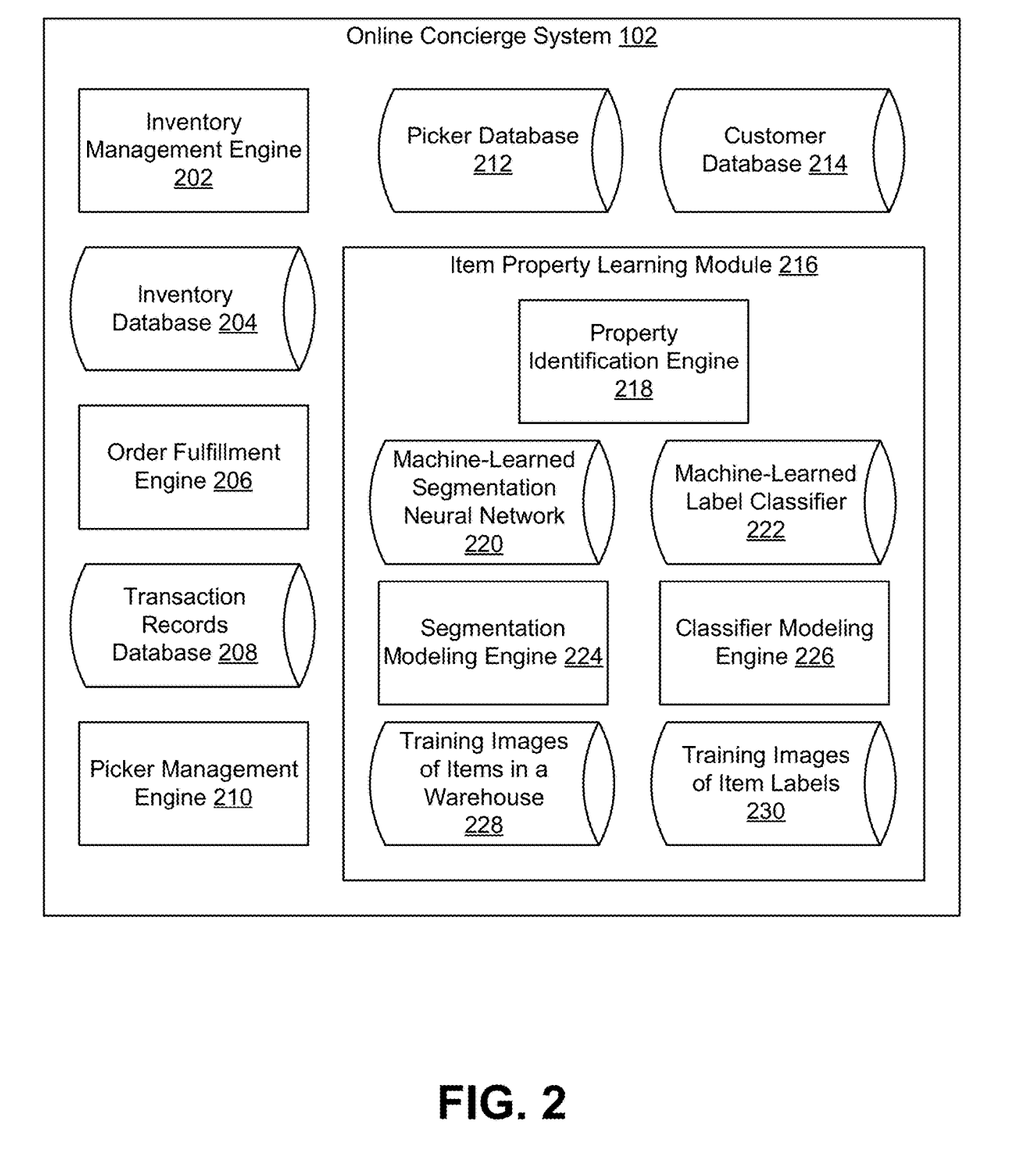
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. The inventory database 204 also stores information about various item properties, such as vegan, organic, gluten free, etc. The inventory database 204 also stores purchasing rules associated with each item, if they exist. For example, age-restricted items such as alcohol and tobacco are flagged accordingly in the inventory database 204. The inventory management engine 202 may receive updated item information from a machine-learned segmentation neural network 220 and/or a machine-learned label classifier 222, such as a property of an item in an inventory database 204, and adds the updated item information to the inventory database 204. The inventory management engine 202 receives updated item property information from the machine-learned segmentation neural network 220 and/or the machine-learned label classifier 222 in a process described with respect to the item property learning module 216 and FIGS. 4-7B.

The online concierge system 102 includes an order fulfillment engine 206 which is configured to synthesize and display an ordering interface to each customer 104 (for example, via the CMA 106). The order fulfillment engine 206 is also configured to access an inventory database 204 in order to determine which items are available at which warehouses 110, and to identify properties associated with the items. The order fulfillment engine 206 determines a sale price for each item ordered by a customer 104. Prices set by the order fulfillment engine 206 may or may not be identical to in-store prices determined by retailers (which is the price that customers 104 and pickers 108 would pay at retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate warehouse to fulfill the order based on one or more parameters, such as a probability of item availability, the contents of the order, the inventory of the warehouses, and the proximity to the delivery location. The picker management engine 210 then identifies one or more appropriate pickers 108 to fulfill the order based on one or more parameters, such as the pickers' proximity to the appropriate warehouse 110 (and/or to the customer 104), his/her familiarity level with that particular warehouse 110, and so on. For example, the picker management engine 210 identifies pickers by comparing the parameters to data retrieved from a picker database 212. The picker database 210 stores information describing each picker 108, such as his/her name, gender, rating, previous shopping history, and so on.

As part of fulfilling an order, the order fulfillment engine 206 and/or picker management engine 210 may also access a customer database 214 which stores information describing each customer. This information could include each customer's name, address, gender, shopping preferences, favorite items, stored payment instruments, and so on.

Learning Item Properties for the Inventory Database

The online concierge system 102 includes an item property learning module 216 for learning properties of items in the inventory database 204 based on images of items. The inventory management engine 214 is configured to populate the inventory records in the inventory database 204 based on information received from the item property learning module 216. Properties that can be learned by the item property learning module 216 include whether or not an item is USDA Organic, International Organic, Soil Association Certified Organic, Certified Naturally Grown, non-GMO, GE-free, gluten-free, Hormone-free, RBGH-free, antibiotic-free, Kosher, Halal Certified, Certified B Corporation, Vegan, American Grassfed, Free-range, Cage-free, Made in America, Country of Origin, Animal Welfare Approved, American Humane Certified, Bird Friendly, Food Alliance Certified, Salmon Safe, Certified Sustainable Seafood, Fair Trade Certified, USDA quality gradings, any other food grading, any certification or other food characteristic. An item property is any food attribute, such as any attribute that is used to compare food items, such as a grading system or certification. Item properties may be any official or unofficial grading or certification. The item properties are each associated with one or more graphic labels, which are standard symbols that convey the property to a consumer and are located on packaging of an item and are referred to herein as item labels.

Item properties are often not included in the inventory information provided to the online concierge system 102 by the warehouses 110. However, these properties may be important to consumers' selection of items to add to a delivery order, whether due to a consumer's dietary restrictions, health concerns, religious practices, etc. If these item properties are not included in the inventory database 204 to be displayed to a user for selecting items in a delivery order, the customer 104 may not be able to make a fully informed decision, and may avoid purchasing items, or purchase items and later decide to return food or request replacement items. This reduces the efficiency of the environment 100.

As discussed above, in conventional systems, adding item properties to the inventory database 204 was a manual process. While item properties can be indicated through common graphic labels or "item labels," which appear on item packaging, this information is often not included in the inventory information provided by the warehouses 110. To update property information of an item in the inventory database 204, these item labels were typically manually read and coded as item properties in the inventory database 204. While food labels were designed to be easily understandable to humans, they cannot be simply read and coded by computers. Recognizing a visual symbol on an image of an item is complicated by the fact that the available image of the item's packaging, e.g., a photograph taken in a warehouse, may obscure or distort these visual symbols. For example, due to placement of the item label on the item and/or the placement of the item in the warehouse, a property label depicted in an item image may be bent, partially obscured by other items, or otherwise not easily visible. Complicating matters, the item labels used on packaging do not always translate well to a designated item property used within an inventory database, since labels associated with properties may not be standardized, and there may be many different labels associated with a single property. For example, an item may be associated with an "organic" property, but there are several different organic certifications (USDA, International, etc.), which each have different graphics or item labels. From the images alone, it can be difficult for a computer system to (1) determine whether an image of an item has a label indicating an item property, (2) identify the label within the image of an item, and (3) correlate the label to a particular item property.

To enable an automated process of augmenting the inventory database 204 with accurate item properties, the item property learning module 216 performs a process for converting images of item labels to one or more item properties used by the inventory database 204. In particular, a property identification engine 218 uses a machine-learned segmentation neural network 220 to identify item labels in images of items corresponding to items included in the inventory database 204. A set of pixels in the image that are associated with the label are isolated from the image of the item. The property identification engine 218 then uses a machine-learned label classifier 222 to classify the item labels and to identify the item property associated with the label. The pixels associated with item labels are thus input into the machine-learned label classifier 222 to identify a property indicated by the label. The property identification engine 218 then updates the inventory database 204 with the determined property. Using the machine-learned label classifier and the machine-learned segmentation neural network 220 allows the online concierge system 102 to augment the inventory database 204 with item properties without manual intervention. The process of determining item properties is described in further detail below.

Machine-Learned Segmentation Neural Network

The image property learning module 216 includes a machine-learned segmentation neural network 220, a segmentation modeling engine 224 and training images of items in a warehouse 228. The segmentation modeling engine 224 uses the training images of items in a warehouse 228 to generate the machine-learned segmentation neural network 220. The machine-learned segmentation neural network 220 can learn from the training images of items in a warehouse 228, rather than follow only explicitly programmed instructions. The property identification engine 218 uses the machine-learned segmentation neural network 220 to determine which pixels in an image of an item are associated with a potential item label, as well as the pixel locations within the image. Thus the machine-learned segmentation neural network 220 performs both a classification of the pixels within an image of an item (e.g., if they are item labels or not item labels) as well as a localization of the classified pixels (e.g., where in the image the classified pixels are located).

The machine-learned segmentation neural network 220 identifies the presence and location of item labels in images of items in the inventory database 204. The images of items in the inventory database 204 may be provided to the online concierge system 102 by a picker, such as picker 108, through the PMA 112 (e.g., in a photograph taken by the picker 108 in a warehouse 110), from a retailer, or from another source or a combination of sources. The training images of items in a warehouse 228 may similarly be provided to the online concierge system 102 through the PMA 112, from retailers, or from other sources. In some examples, the training images of items in a warehouse 228 are stored in the inventory database 204 along with item property identifiers. Thus an item in the inventory database 204 may have associated images that are also included in the training images of items in a warehouse 228. An image of an item in the training images of items in a warehouse 228 may be a photograph comprised of image pixels.

The training images of items in a warehouse 228 are tagged with information indicating which segments of the training images indicate an item label, and which segments of the training images are not item labels. For example, each pixel of the training images of items in a warehouse 228 is tagged as being an item label or not an item label. In some examples, the training images of items in a warehouse 228 are labeled with areas of an image that are item labels, such as a bounding box that surrounds an item label. In some examples, a single image in the training images of items in a warehouse 228 contains images of multiple items and multiple item labels. The training images of items in a warehouse 228 may be tagged based on inventory information provided to the online concierge system 102 by a warehouse, such as warehouses 110. In some examples, the training images of items in a warehouse 228 are tagged by a picker 108 that provides the training image to the online concierge system 102. For example, a picker 108 in a warehouse 110 may obtain a photograph of an item in the warehouse 110, indicate in the photograph the location of an item label, and provide the photograph with the location of an item label to the online concierge system 102 via the PMA 112. The online concierge system 102 then incorporates the tagged photograph of the item into the training images of items in a warehouse 228. In other examples, the training images of items in a warehouse 228 are tagged by a third party other than the picker 108. The training images of items in a warehouse 228 may visually reflect actual conditions of items and item labels in a warehouse, such as crumpled packaging that may distort a label or lighting that under or over exposes an item label. In some examples, the online concierge system 102 may request a picker in a store to provide more training images of items in a warehouse 228. For example, if an item does not have images associated with it in the inventory database 204, the online concierge system 102 may request an image. In other examples, if an item has a low confidence score output by a machine-learned segmentation neural network 220, the online concierge system 102 may request an additional image.

The segmentation modeling engine 224 uses the training images of items in a warehouse 228 to generate the machine-learned segmentation neural network 220. The machine-learned segmentation neural network 220 contains a set of functions that relate an input image to a location of an item label in the input image. The set of functions may be kernel functions, which act as filters or mappings between layers of the machine-learned segmentation neural network 220. The kernel functions assign different weights to the pixel values of an image input into the machine-learned segmentation neural network 220. The segmentation modeling engine 224 trains the machine-learned segmentation neural network 220 with the training images of items in a warehouse 228 to determine the kernel functions and relative weights between each layer of the machine-learned segmentation neural network 220. The kernel function weights may be randomly initialized, e.g., from a Gaussian distribution prior to training.

In some examples, the segmentation modeling engine 224 trains the machine-learned segmentation neural network 220 in response to adding new images to the training images of items in a warehouse 228. In some examples, the segmentation modeling engine 224 trains the machine-learned segmentation neural network 220 in response to a low confidence score output by the machine-learned segmentation neural network 220. The machine-learned segmentation neural network 220 may improve confidence scores through re-training by the segmentation modeling engine 224 on new or more images in the training images of items in a warehouse 228.

In some embodiments, the machine-learned segmentation neural network 220 is a convolutional neural network (CNN), such as a U-Net Convolutional Neural Network. In this example, the machine-learned segmentation neural network 220 is structured with a contracting path and an expansive path. The contracting path includes a series of convolutions, whose outputs are then input into an activation function, such as a rectified linear unit (ReLU), in an activation layer. The convolution layer followed by an activation layer may be repeated twice, before the results are then pooled in a pooling layer. In some examples, the results are Max Pooled in the pooling layer, such that maximum value is selected from a cluster of neurons in the activation layer. In some examples, the pooling layer may be a 2×2 max pooling operation. In the contracting path, there may be any number of convolutions, activation and pooling layers. In some examples, there are four repetitions of: a first convolution layer, a first activation layer, a second convolution layer, a second activation layer, and a max pooling layer. In the contracting path, the max pooling layer down samples the previous activation layer, such that the pixel dimensions of an input image are progressively reduced.

The expansive path includes a series of deconvolutions, whose outputs are then input into an activation function, which may be the same activation function as in the contracting path. The deconvolution layer followed by an activation layer may be repeated twice, before the results are then up-sampled. In some examples, the dimensions of the deconvolution layer and the upsampling are the same as the dimensions of the convolution layer and the pooling layer of the contracting path. In the expansive path, there may be any number of deconvolutions, activation and pooling layers. In some examples, there are four repetitions of the following operations: a first deconvolution layer, a first activation layer, a second deconvolution layer, a second activation layer, and an up sampling. In the expansive path, the upsampling increases the pixel dimensions of a previous activation layer, such that the pixel dimensions of an output image are progressively increased. In some examples, the pixel dimensions of the input image are the same pixel dimensions of the output segmentation image. Alternatively, the input image and output segmentation image have different pixel dimensions. The U-Net structure classifies pixels of an input image as being associated with an item label or not associated in an item label, and also localizes the classified pixels within the original input image. Further details regarding the machine-learned segmentation neural network 220 are described with reference to FIGS. 4-7B.

Machine-Learned Label Classifier

The item property learning module 216 includes a machine-learned label classifier 222. The machine-learned label classifier 222 classifies item labels identified by the machine-learned segmentation neural network 220 to determine an item property represented by an item label. The machine-learned label classifier 222 learns from the training images of item labels 230, rather than follow only explicitly programmed instructions. The property identification engine 218 uses the machine-learned label classifier 222 to determine item properties from the images of item labels output by the machine-learned segmentation neural network 220. Thus the machine-learned label classifier 222 classifies the item labels according to various item properties, such as Organic, Kosher, or any other item properties that can be identified from a label.

The machine-learned label classifier 222 identifies the properties associated with item labels. In some examples, the machine-learned label classifier 222 identifies the properties associated with portions of images of items in the inventory database 204 that the segmentation modeling engine 224 has determine are item labels. Thus the property identification engine 218 inputs pixels classified as "item labels" by the segmentation engine 220 into the machine-learned label classifier 222 to determine what property is indicated by the item label. The training images of item labels 230 that the classifier modeling engine 226 uses to train the machine-learned label classifier are provided to the online concierge system 102 by a picker through the PMA 112, by a retailer, or from other sources or a combination of sources. In some examples, the training images of item labels 230 are stored in the inventory database 204 along with item property identifiers. Thus an item in the inventory database 204 may have one or more associated images that are also included in the training images of item labels 230. The images in the training images of item labels 230 may be portions of photographs of items taken in a warehouse 110.

The training images of item labels 230 are tagged with the item property of each item label. The training images of item labels 230 may include both positive images of item labels (i.e., show the item label) and negative images of item labels (i.e., do not show item labels). Item labels that indicate the same property may be grouped together in the training images of item labels 230. For example, item labels for International Organic may be grouped with item labels for USDA Organic. The training images of item labels 230 may be tagged based on inventory information provided to the online concierge system 102 by a warehouse, such as warehouses 110. In some examples, the training images of item labels 230 are tagged by a picker 108 that provides the training image to the online concierge system 102. For example, a picker 108 in a warehouse 110 may obtain a photograph of an item in the warehouse 110, and indicate in the photograph the item label and the property associated with the label, and communicate the photograph to the online concierge system 102. In some examples, the training images of item labels 230 are tagged by a third party other than the picker 108. The online concierge system 102 then incorporates the tagged photograph of the item into the training images of item labels 230. The training images of item labels 230 may visually reflect actual conditions of item labels in a warehouse, such as crumpled packaging that may distort a label or lighting that under or over exposes an item label.

The classifier modeling engine 226 uses the training images of item labels 230 to generate the machine-learned label classifier 222. The machine-learned label classifier 222 contains a set of functions that relate an input image of an item label to an item property. The set of functions may be kernel functions, which act as filters or mappings between layers of the machine-learned label classifier 222. The kernel functions assign different weights to the pixel values of an image of an item label input into the machine-learned label classifier 222. The classifier modeling engine 226 trains the machine-learned label classifier 222 with the training images of item labels 230 to determine the kernel functions and relative weights between each layer of the machine-learned label classifier 222. In some examples, the classifier modeling engine 226 may train the machine-learned label classifier 222 in response to a low confidence score output by the machine-learned label classifier 222. Thus the machine-learned label classifier 222 may improve confidence scores through re-training on new or more images in the training images of item labels 230.

The machine-learned label classifier 222 may be a CNN. In some examples, there is a single machine-learned label classifier 222 which classifies all input images of item labels with all item properties. In other examples, there may be separate machine-learned label classifiers 222 for each item property (e.g., one classifier for organic, another classifier for Kosher, etc.) or for each label (e.g., one classifier for USDA organic, another classifier for International Organic, etc.). If the item property learning module 216 includes multiple different classifiers, the classifier modeling engine 226 may train the separate machine-learned label classifiers 222 with different groupings of training images of item labels 230 with the same item properties or labels. For example, if a machine-learned label classifier 222 classifies item labels as being organic or not organic, then the classifier modeling engine 226 may train the machine-learned label classifier 222 with grouped training images of organic labels within the training images of item labels 230.

The machine-learned label classifier 222 may have any number of convolutional, activation or pool layers. The convolutional layers of the machine-learned label classifier 222 may each be followed by an activation layer. A pooling layer, such as a max pooling layer, may follow an activation layer. The output of the machine-learned label classifier 222 may be an item property associated with an input item label. In some examples, the machine-learned label classifier 222 provides a confidence score associated with the item label classification. If the confidence score is above a threshold level (e.g., 0.95, or 0.99), the inventory management engine 202 may update the item entry in the inventory database 204 with the item property indicated by the machine-learned label classifier 222. The machine-learned label classifier 222 is described in more detail with reference to FIGS. 4-7B.

Customer Mobile Application

Figure 3A:
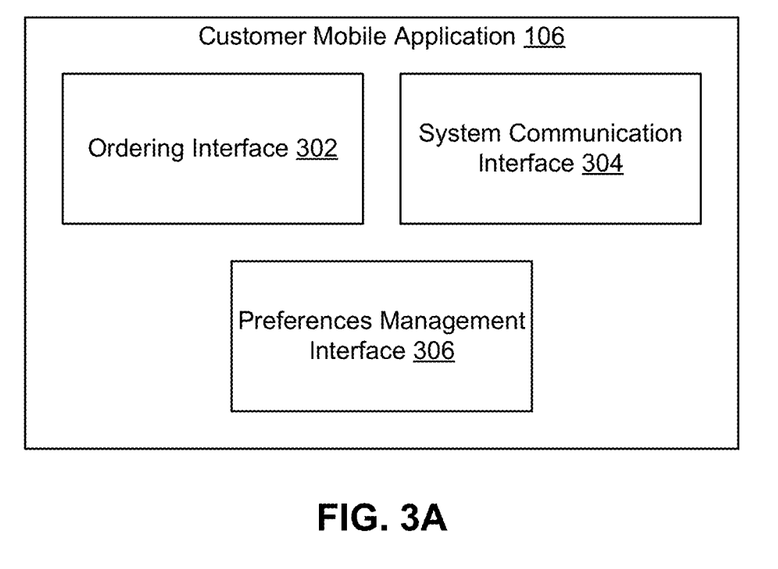
FIG. 3A is a diagram of a customer mobile application (CMA) 106, according to one embodiment.

FIG. 3A is a diagram of the CMA 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Picker Mobile Application

Figure 3B:
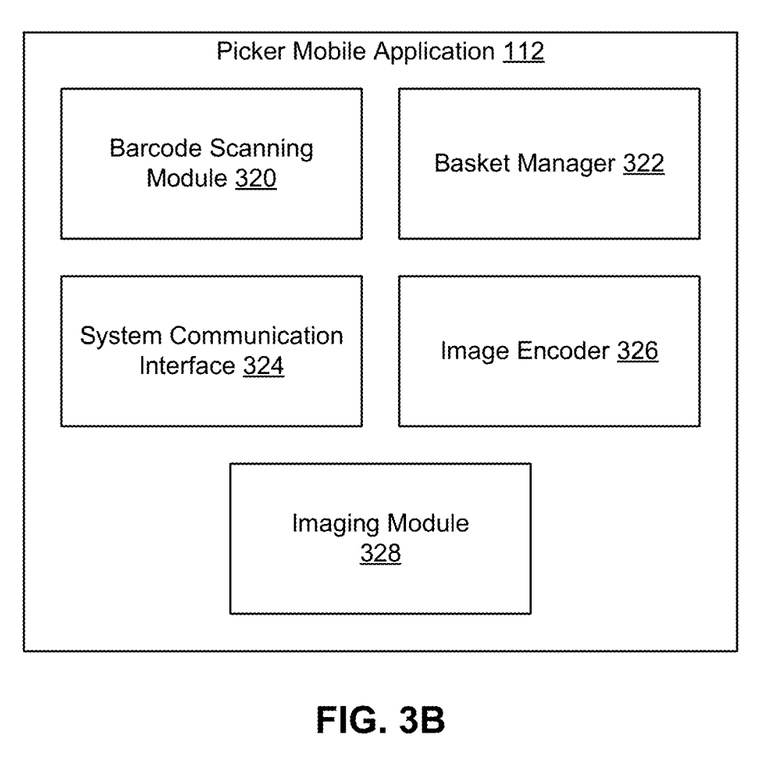
FIG. 3B is a diagram of a picker mobile application (PMA) 112, according to one embodiment.

FIG. 3B is a diagram of the PMA 112, according to one embodiment. The PMA 112 includes a barcode scanning module 320 which allows a picker 108 to scan an item at a warehouse 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. PMA 112 also includes a basket manager 322 which maintains a running record of items collected by the picker 108 for purchase at a warehouse 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes a system communication interface 324 which interacts with the online shopping concierge system 102. For example, the system communication interface 324 receives an order from the system 102 and transmits the contents of a basket of items to the system 102. The PMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

The PMA 112 includes an imaging module 328, which allows a picker 108 to collect images of items in a warehouse, including images of item labels. The imaging module 328 allows a picker 108 to collect images, e.g., by taking a photograph of one or more items in a warehouse. The imaging module 328 may also provide an interface for the picker 108 to identify the item, or the picker mobile application 112 may request that the picker 108 take a photograph of a specific item. The imaging module 328 sends the photograph and item identifier to the online concierge system 102, which may identify item properties for the item using the item property learning module 216. In some embodiments, the imaging module 328 also allows a picker 108 to indicate the location and type of an item label in a collected image. For example, a picker 108 may draw a bounding box around an item label to indicate that the identified pixels are associated with an item label, and select a property associated with the item label. The imaging module 328 sends the resulting tagged image of an item label on an item in a warehouse to the online concierge system 102, which may incorporate it into the training images of items in a warehouse 228. As another example, the picker 108 may select an area in an image that shows an item label and input the item property associated with the item label, such as 'organic,' 'vegan,' etc. The imaging module 328 sends the tagged image of an item label and its associated property to the online concierge system 102, which may incorporated it into the training images of item labels 230.

Updating an Inventory Catalog

Figure 4:
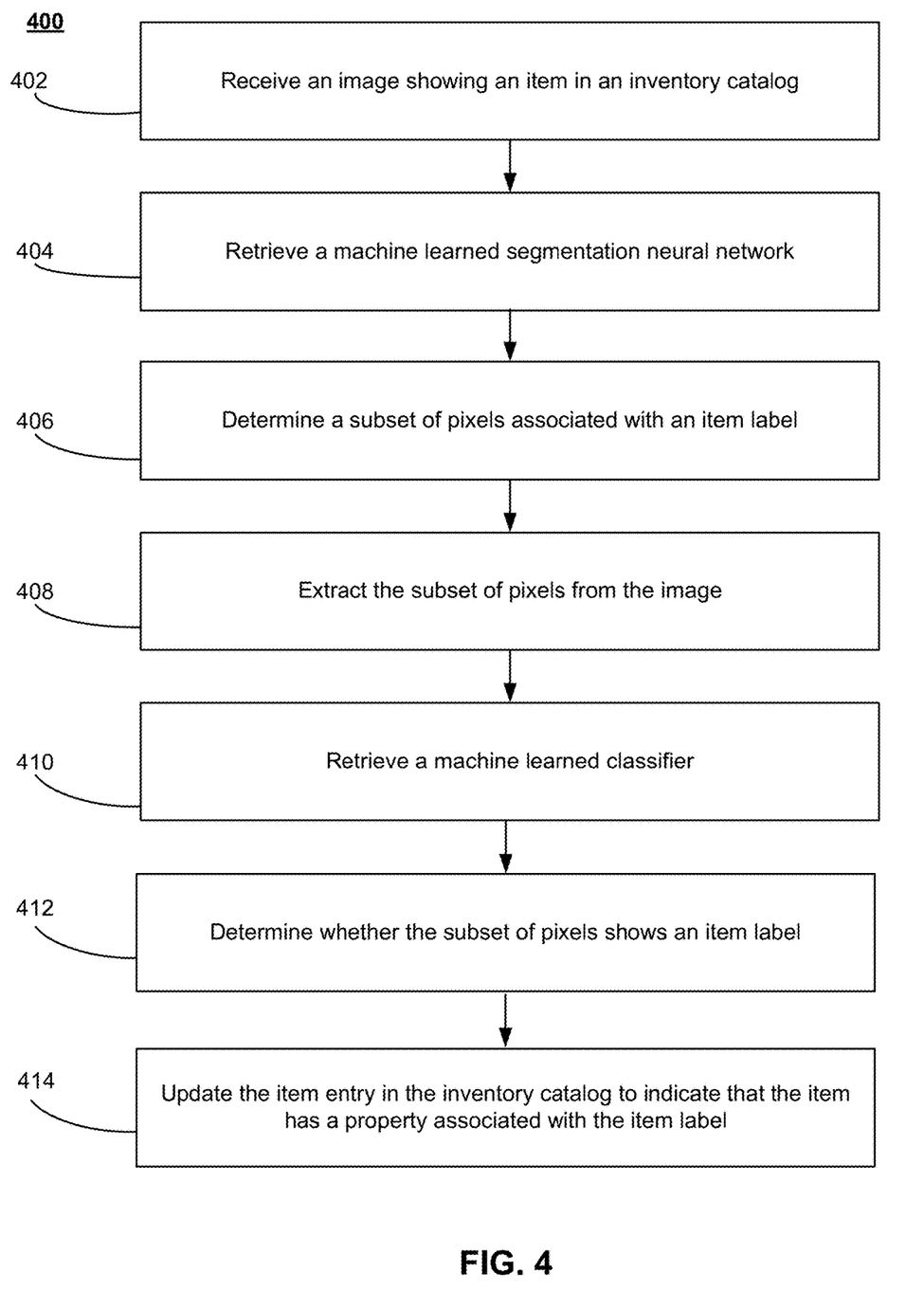
FIG. 4 is a flowchart illustrating a process for updating an inventory catalog, according to one embodiment.

FIG. 4 is a flowchart illustrating a process 400 for updating an inventory catalog, according to one embodiment. The process 400 uses the machine-learned segmentation neural network 220 in combination with the machine-learned label classifier 222 to update item information in the inventory database 204. Specifically, the process 400 identifies labels in images of items, determines an item property associated with the label, and updates the item information in the inventory database 204 with the item property. The process 400 may be carried out by the online concierge system 102, e.g., by the property identification engine 218 in conjunction with the machine-learned segmentation neural network 220 and the machine-learned label classifier 222.

The property identification engine 218 receives 402 an image showing an item in an inventory catalog. The inventory catalog may be the inventory database 204 as described in FIG. 2. The online concierge system 102 may receive an image showing an item in the inventory catalog from a picker, such as the picker 108. For example, a picker may provide the online concierge system 102 with an image of an item in a warehouse. The picker may identify the item, and convey the image with an item identifier to the online concierge system 102. The property identification engine 218 may request that a picker 108 provide an image of an item in response to the property identification engine 218 determining that there is missing item property information for the item in the inventory catalog. For example, an item entry in the inventory catalog may not have an indication regarding if the item is organic or not.

The property identification engine 218 retrieves 404 a machine-learned segmentation neural network. This may be the machine-learned segmentation neural network 220 as described with reference to FIG. 2. The machine-learned segmentation neural network is configured to receive as input an image of an item in the inventory catalog, such as the image received at 402.

Figure 5A:
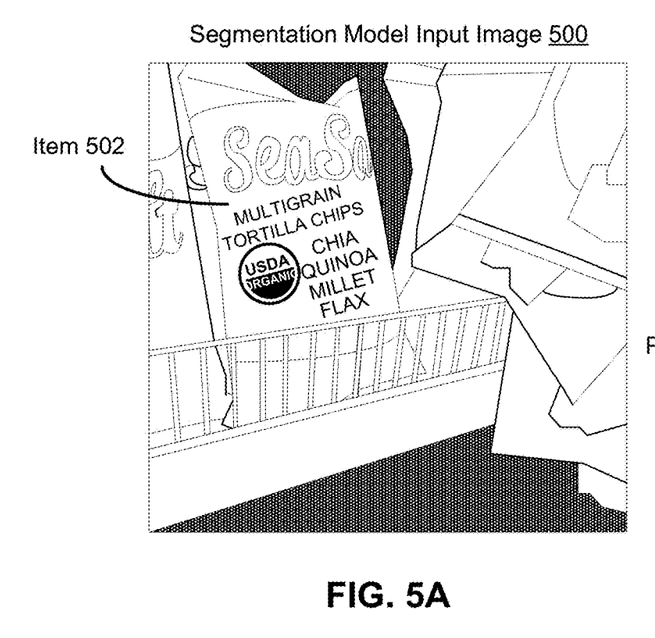
FIG. 5A is an illustration of an input image into a segmentation model, according to one embodiment.
Figure 5B:
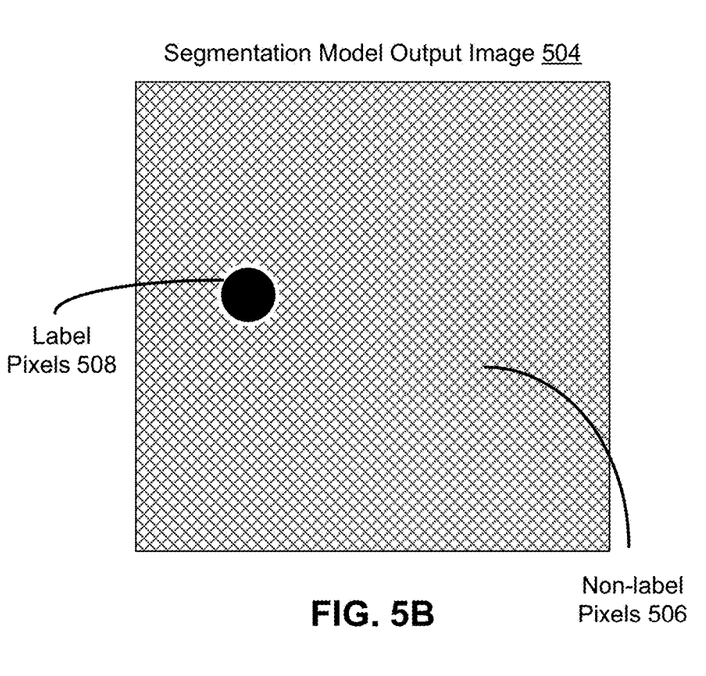
FIG. 5B is an illustration of an output image of the segmentation model, according to one embodiment.
Figure 7A:
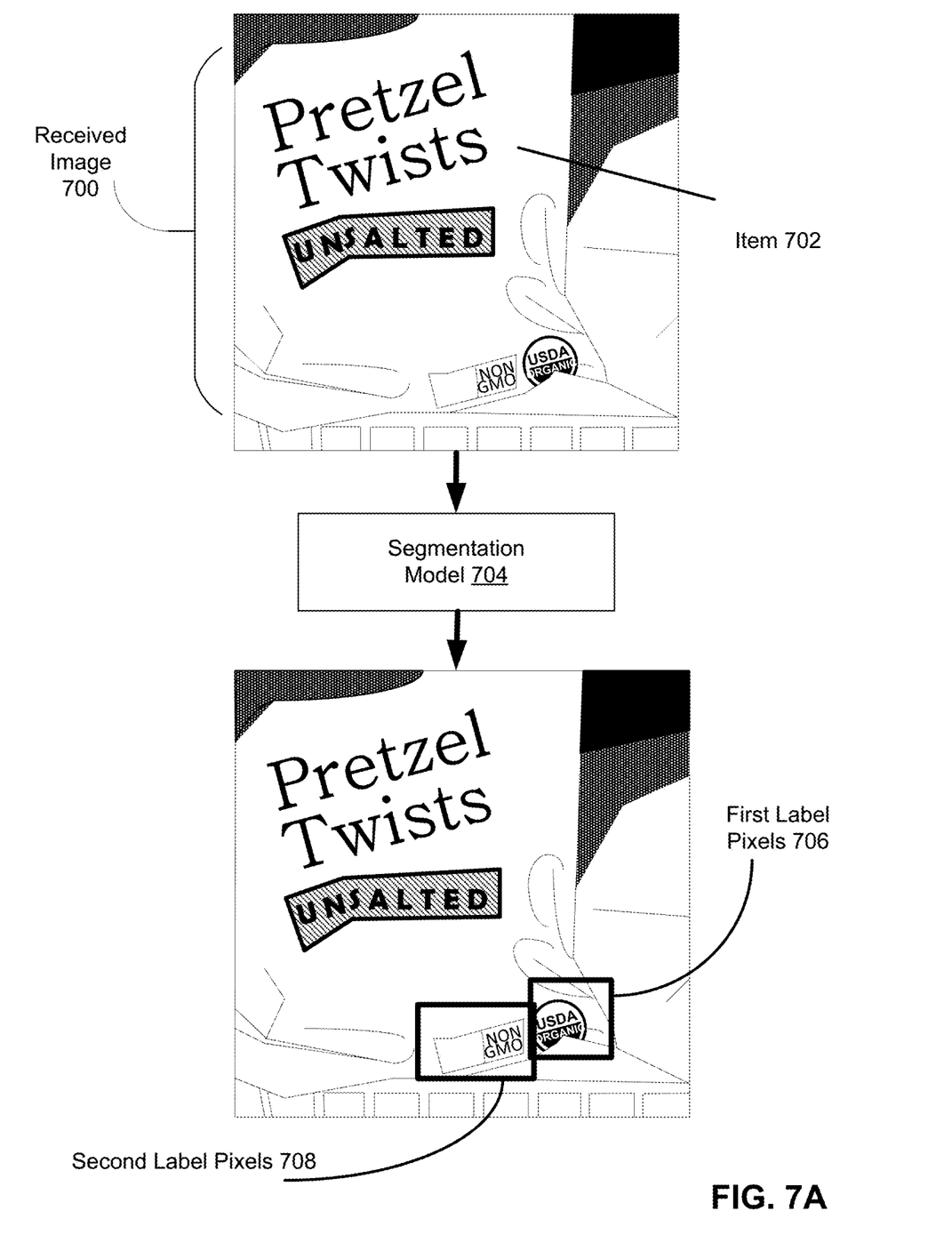
FIG. 7A is an illustration of an image processed by a segmentation model, according to one embodiment.

The property identification engine 218 uses the machine-learned segmentation neural network 220 to determine 406 a subset of pixels associated with an item label. The determination 406 may include both a categorization of the pixels in a received image as either being associated with an item label or not associated with an item label, as well as a localization of the item label pixels within the original received image input into the machine-learned segmentation neural network. An example illustration of the subset of pixels associated with an item label is shown in FIGS. 5A-B and 7A. There may be a confidence score associated with the pixels, which indicates how likely the pixels are to indicate an item label.

The property identification engine 218 extracts 408 the subset of pixels from the image. The property identification engine 218 may define a bounding box around a subset of pixels from the image, and crop the bounding box from the original image. In other examples, the online concierge system 102 may extract only pixels identified by a machine-learned segmentation neural network as being associated with an item label. An example illustration of the subset of pixels extracted from the image is shown in FIGS. 5A-7B.

The property identification engine 218 retrieves 410 a machine-learned classifier. This may be the machine-learned label classifier 222 as described with reference to FIG. 2. The machine-learned label classifier 222 is configured to take as input the extracted subset of pixels identified by the machine-learned segmentation neural network.

Figure 6A:
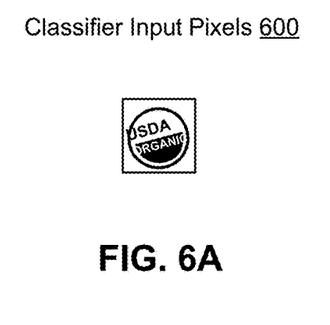
FIG. 6A is an illustration of an image from the segmentation model input into a classification model, according to one embodiment.
Figure 6B:
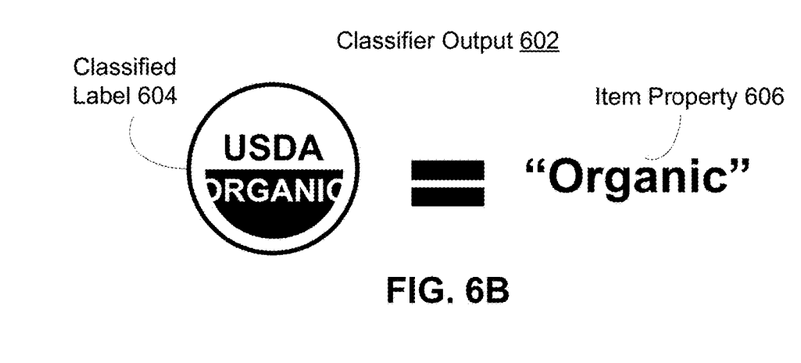
FIG. 6B is an illustration of the output of the classification model, according to one embodiment.
Figure 7B:
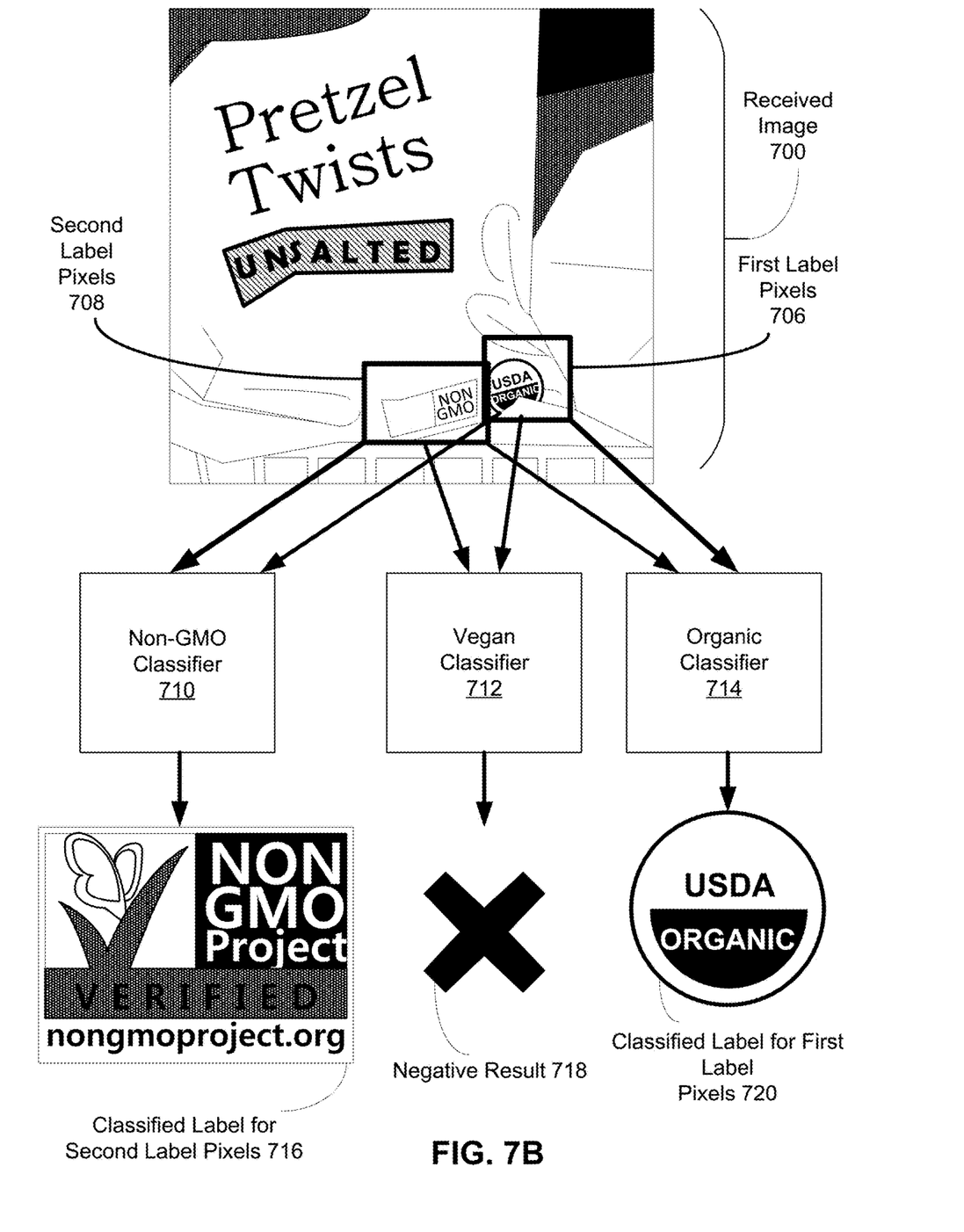
FIG. 7B is an illustration of an image processed by a classifier, according to one embodiment.

The property identification engine 218 uses the machine-learned label classifier 222 to determine 412 whether the subset of pixels shows an item label. The determining may include associating a subset of pixels with an item property. For example, the machine-learned label classifier 222 may classify the subset of pixels as being an organic label and thus having an organic property. In some examples, a confidence score may be associated with the item property, which indicates a certainty of a machine-learned label classifier that the pixels show the item label. An example illustration of the determining 412 is shown in FIGS. 6A-B and 7B.

The property identification engine 218 updates 414 the item entry in the inventory catalog to indicate that the item has a property associated with the item label. For example, in response to determining that a subset of pixels of an item shows an item label, the online concierge system 102 updates the item entry on which the item label is located with a property, such as being organic or being Kosher. In some examples, if a confidence score is above a threshold, then the online concierge system 102 updates the item entry in an item catalog, such as the inventory database 204. Thus as a result of the process 400, an item catalog is updated with additional information about an item, such as an item property, which otherwise was missing from the catalog. The item property can then be displayed to a user of the online concierge system 102 to help them make better decisions about which items to select for delivery.

FIG. 5A is an illustration of an image input into a segmentation model, according to one embodiment. The segmentation model may be the machine-learned segmentation neural network 220. The segmentation model input image 500 shows an item 502. In some examples, the online concierge system 102 may be missing item properties associated with item 502. For example, the item 502 may be included in the inventory database 204, but may not have an indication in the inventory database 204 as to whether or not the item 502 is organic. The segmentation model input image 500 is input into the machine-learned segmentation neural network 220. The segmentation model input image 500 is composed of a number of pixels. The machine-learned segmentation neural network 220 classifies the pixels in the image as being associated with an item label or not associated with an item label, as well as the location of label pixels in the image.

FIG. 5B is an illustration of an output image of the segmentation model, according to one embodiment. The segmentation model output image 504 is an example of an output of the machine-learned segmentation neural network 220. As shown, the machine-learned segmentation neural network 220 classifies the pixels of the segmentation model input image 500 into two categories: being associated with an item label, or not associated with an item label. Thus the pixels in the output image 504 are either the non-label pixels 506 or label pixels 508. In addition to this classification, the segmentation model locates the classified pixels within the original image. This allows the online concierge system to extract these pixels for further identification, as discussed with reference to FIG. 4.

FIG. 6A is an illustration of an image output by segmentation model and input into a classification model, according to one embodiment. The classification model may be the machine-learned label classifier 222 as discussed in further detail with reference to FIG. 2. The classifier input pixels 600 are label pixels 508 extracted by the segmentation model. In some examples, the classifier input pixels 600 include the label pixels 508 identified by the segmentation model as well as additional surrounding pixels in a bounding box around the label pixels 508. In some examples, the classifier input pixels 600 are extracted from the original image input into the segmentation model, such as the segmentation model input image 500. In some examples, the classifier input pixels 600 are downsampled from the original image input into the segmentation model, such that the pixel resolution of an image input into the classifier model is different from a pixel resolution in the original image.

FIG. 6B is an illustration of the output of the classification model, according to one embodiment. The classifier output 602 identifies the item property 606 indicated by the input classifier input pixels 600. Thus the item label is classified as the classified label 604 and the item property indicated by the label pixels 508 is identified as indicating the item property 606. In response to the classifier model identifying the item property 606, the property identification engine 218 updates the entry of the item 502 in the inventory database 204 with the item property 606. The identified item property 606 may have an associated confidence score, which indicates a certainty that the input pixels 800 indicate the item property 606.

FIG. 7A is an illustration of an image processed by a segmentation model, according to one embodiment. The received image 700 may be the image received 402 showing an item in an inventory catalog, as discussed with reference to FIG. 4. The received image 700 includes an image of item 702. The property identification engine 218 inputs the received image 700 into the segmentation model 704. The segmentation model 704 may be the machine-learned segmentation neural network 220, as discussed with reference to FIG. 2. The segmentation model 704 identifies first label pixels 706 and second label pixel 708 located on the item 702. As shown in FIG. 7A, the item labels on the item 702 in the received image 700 may be distorted by rumpled packaging, be under or over exposed in the received image 700, be partial obscured by other items, or otherwise reflect real world conditions of items in a warehouse. Because the segmentation model 704 is trained using images of items in a warehouse, as described with reference to FIG. 2, the segmentation model 704 is still able to identify the item labels. The segmentation model 704 identifies any number of labels located on the item 702. As shown, item 702 includes the first label pixels 706 and the second label pixel 708, which may each indicate different item properties.

FIG. 7B is an illustration of an image processed by a set of classifiers, according to one embodiment. In response to the segmentation model 704 identifying the first label pixels 706 and the second label pixel 708 within the received image 700 as being associated with item labels, the property identification engine 218 extracts the first label pixels 706 and the second label pixel 708 from the received image 700. The property identification engine 218 retrieves 410 one or more machine learned classifiers, including a non-GMO classifier 710, a vegan classifier 712, and an organic classifier 714 as illustrated in FIG. 7B. In some embodiments, separate classifier models may be trained to identify different properties. Thus the non-GMO classifier 710 identifies if an input image is or is not a non-GMO label, a separate vegan classifier 712 identifies if an input image is or is not a vegan label, and a separate organic classifier 714 identifies if an input image is or is not an organic label. In other embodiments, a single classifier may identify a property associated with an input image of an item label. In these embodiments, the non-GMO classifier 710, vegan classifier 712 and organic classifier 714 may all be incorporated into a single classifier that is able to classify input images of item labels as being non-GMO, vegan or organic.

In FIG. 7B, the first label pixels 706 are input into the non-GMO classifier 710, the vegan classifier 712, and the organic classifier 714 to determine if the first label pixels 706 indicate that item 702 is non-GMO, vegan or organic. The second label pixel 708 are also input into the non-GMO classifier 710, the vegan classifier 712 and the organic classifier 714. The non-GMO classifier 710 determines that the second label pixel 708 are a non-GMO label and that the item 702 is associated with the non-GMO item property. The vegan classifier 712 determines that neither of the first label pixels 706 nor the second label pixel 708 are vegan labels, and outputs a negative result 718. The organic classifier 714 determines that the first label pixels 706 are an organic label and that the item 702 is associated with the organic item property. As a result of the outputs from the non-GMO classifier 710, the vegan classifier 712 and the organic classifier 714, the item 702 may be updated in an item catalog, such as the inventory database 204, as having the non-GMO and organic item properties. Each of the outputs of the non-GMO classifier 710, the vegan classifier 712 and the organic classifier 714 may have an associated confidence score.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for populating an inventory catalog, the method comprising:
   accessing an image of an item and an item identifier from a record in an inventory catalog datastore., the image comprising a plurality of pixels, the inventory catalog datastore comprising records about properties of items available to add to an order, the record associated with the item identifier missing one or more properties of the item, wherein each property is a standardized attribute used to compare items;
   retrieving a machine learned segmentation neural network trained, based on a set of images and associated properties, to determine locations of pixels in an image that are associated with an item label on the item indicating a property;
   determining, using the machine learned segmentation neural network, a subset of pixels associated with the item label in the accessed image and identifying locations of the subset of pixels of the accessed image;
   extracting the subset of pixels from the accessed image;
   retrieving a machine learned classifier trained, based on a set of images of the item label, to determine whether an image shows the item label;
   determining, using the machine learned classifier, that the extracted subset of pixels shows the item label, wherein the item label indicates a property missing from the record for the item; and
   updating the record associated with the accessed item identifier for the item in the inventory catalog datastore to indicate that the item has the property associated with the item label.

2. The method of claim 1, wherein the machine learned segmentation neural network is a convolutional neural network, and is trained, using machine learning, based in part on a plurality of images of item labels on items in a warehouse.

3. The method of claim 1, wherein the machine learned segmentation neural network is a U-Net neural network.

4. The method of claim 1, further comprising:
   determining, using the machine learned segmentation neural network, a plurality of subsets of pixels and pixel locations in the image that are associated with a plurality of item labels, and retrieving the plurality of subsets of pixels from the image; and
   retrieving a plurality of machine learned classifiers, wherein each of the machine learned classifiers is trained to determine whether each subset of pixels shows a single item label in a plurality of item labels.

5. The method of claim 1, wherein the machine learned classifier is a convolutional neural network, and is trained, using machine learning, based in part on a plurality of images of item labels in a warehouse.

6. The method of claim 1, wherein the property associated with the item label is at least one of: USDA Organic, International Organic, non-GMO, gluten-free, Kosher, Certified B Corporation, and Vegan.

7. The method of claim 1, further comprising:
   determining, using the machine learned classifier, a confidence score of the property associated with the subset of pixels of the image; and
   updating the record associated with the accessed item identifier in the inventory catalog datastore with the property if the confidence score is above a threshold.

8. The method of claim 1, wherein at least a subset of item identifiers in the inventory catalog datastore are each associated with a plurality of images of an item in a warehouse, and wherein the plurality of images are included in the set of images and the set of images of the item label.

9. The method of claim 1, further comprising:
   selecting the image associated with the item identifier in the inventory catalog datastore based on the one or more properties missing from the record for the item identifier.

10. A non-transitory computer-readable storage medium storing instructions for predicting inventory availability, the instructions when executed causing a processor to:
   accessing an image of an item and an item identifier from a record in an inventory catalog datastore, the image comprising a plurality of pixels, the inventory catalog datastore comprising records about properties of items available to add to an order, the record associated with the item identifier missing one or more properties of the item, wherein each property is a standardized attribute used to compare items;
   retrieving a machine learned segmentation neural network trained, based on a set of images and associated properties, to determine locations of pixels in an image that are associated with an item label on the item indicating a property;

determining, using the machine learned segmentation neural network, a subset of pixels associated with the item label in the accessed image and identifying locations of the subset of pixels of the accessed image;

extracting the subset of pixels from the accessed image;

retrieving a machine learned classifier trained, based on a set of images of the item label, to determine whether an image shows the item label;

determining, using the machine learned classifier, that the extracted subset of pixels shows the item label, wherein the item label indicates a property missing from the record for the item; and updating the record associated with the accessed item identifier in the inventory catalog datastore to include the property associated with the item label.

11. The computer-readable storage medium of claim 10, wherein the machine learned segmentation neural network is a convolutional neural network, and is trained, using machine learning, based in part on a plurality of images of item labels on items in a warehouse.

12. The computer-readable storage medium of claim 10, wherein the machine learned segmentation neural network is a U-Net neural network.

13. The computer-readable storage medium of claim 10, further comprising:

determining, using the machine learned segmentation neural network, a plurality of subsets of pixels and pixel locations in the image that are associated with a plurality of item labels, and retrieving the plurality of subsets of pixels from the image; and retrieving a plurality of machine learned classifiers, wherein each of the machine learned classifiers is trained to determine whether each subset of pixels shows a single item label in a plurality of item labels.

14. The computer-readable storage medium of claim 10, wherein the machine learned classifier is a convolutional neural network, and is trained, using machine learning, based in part on a plurality of images of item labels in a warehouse.

15. The computer-readable storage medium of claim 10, wherein the property associated with the item label is at least one of: USDA Organic, International Organic, non-GMO, gluten-free, Kosher, Certified B Corporation, and Vegan.

16. The computer-readable storage medium of claim 10, further comprising:

determining, using the machine learned classifier, a confidence score of the property associated with the subset of pixels of the image; and updating the record associated with the accessed item identifier in the inventory catalog datastore with the property if the confidence score is above a threshold.

17. The computer-readable storage medium of claim 10, wherein at least a subset of item identifiers in the inventory catalog datastore are each associated with a plurality of images of an item in a warehouse, and wherein the plurality of images are included in the set of images and the set of images of the item label.

18. The computer-readable storage medium of claim 10, further comprising:

selecting the image associated with the item identifier in the inventory catalog datastore based on the one or more properties missing from the record for the item identifier.

* * * * *